(12) United States Patent
Miao et al.

(10) Patent No.: US 12,093,449 B2
(45) Date of Patent: Sep. 17, 2024

(54) METHOD FOR PROCESSING THREE-DIMENSIONAL IMAGE DATA, AND COMPUTER DEVICE

(71) Applicants: Beijing BOE Display Technology Co., Ltd., Beijing (CN); BOE Technology Group Co., Ltd., Beijing (CN)

(72) Inventors: Jinghua Miao, Beijing (CN); Donghua Niu, Beijing (CN); Xuefeng Wang, Beijing (CN); Yanqiu Zhao, Beijing (CN); Yulong Wu, Beijing (CN); Wenyu Li, Beijing (CN); Zhifu Li, Beijing (CN); Lili Chen, Beijing (CN); Hao Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/926,625

(22) PCT Filed: Nov. 29, 2021

(86) PCT No.: PCT/CN2021/134121
§ 371 (c)(1),
(2) Date: Nov. 21, 2022

(87) PCT Pub. No.: WO2023/092595
PCT Pub. Date: Jun. 1, 2023

(65) Prior Publication Data
US 2024/0241577 A1    Jul. 18, 2024

(51) Int. Cl.
*G06F 3/01* (2006.01)

(52) U.S. Cl.
CPC .................................. *G06F 3/013* (2013.01)

(58) Field of Classification Search
CPC ....................................................... G06F 3/013
See application file for complete search history.

(56) References Cited

U.S. PATENT DOCUMENTS

| | | | |
|---|---|---|---|
| 9,088,790 B2* | 7/2015 | Kim | H04N 13/376 |
| 9,866,825 B2* | 1/2018 | Baik | H04N 13/383 |
| 10,861,423 B2* | 12/2020 | Guan | G09G 5/373 |

(Continued)

*Primary Examiner* — Michael Pervan
(74) *Attorney, Agent, or Firm* — XSENSUS LLP

(57) ABSTRACT

Provided is a method for processing three-dimensional image data, applicable to providing three-dimensional image data to a three-dimensional display terminal, wherein the three-dimensional display terminal is provided with a plurality of viewpoints successively arranged, and a viewing region of the three-dimensional display terminal includes a plurality of sub-regions. The method includes: receiving indication information, wherein the indication information is indicative of a number of target sub-regions, the target sub-region being a sub-region, where a viewer is present, in the viewing region; determining a target view based on the indication information, wherein a number of the target views determined in a case that the number of the target sub-regions is 1 is less than the number of the target views determined in a case that the number of the target sub-regions is greater than 1; and transmitting image data of the target view to the three-dimensional display terminal.

20 Claims, 9 Drawing Sheets

(56) References Cited

U.S. PATENT DOCUMENTS

| | | | |
|---|---|---|---|
| 11,385,520 B2* | 7/2022 | Wei | G02F 1/29 |
| 2012/0256909 A1* | 10/2012 | Ihara | H04N 13/366 |
| | | | 345/419 |
| 2015/0077526 A1* | 3/2015 | Kim | H04N 13/349 |
| | | | 348/51 |
| 2016/0086422 A1* | 3/2016 | Keilwert | G07F 17/3211 |
| | | | 463/32 |
| 2016/0086423 A1* | 3/2016 | Keilwert | G07F 17/3211 |
| | | | 463/32 |
| 2017/0041593 A1* | 2/2017 | Wu | H04N 13/31 |
| 2017/0272738 A1* | 9/2017 | Zhao | G09G 3/20 |
| 2018/0252933 A1* | 9/2018 | Wang | G02B 6/005 |
| 2020/0013376 A1* | 1/2020 | Guan | G06F 3/013 |
| 2020/0333681 A1* | 10/2020 | Wei | H04N 13/368 |

* cited by examiner

METHOD FOR PROCESSING THREE-DIMENSIONAL IMAGE DATA, AND COMPUTER DEVICE

CROSS-REFERENCE TO RELATED APPLICATION

The present disclosure is a U.S. national stage of international application No. PCT/CN2021/134121, filed on Nov. 29, 2021, the content of which is herein incorporated by reference in its entirety.

TECHNICAL FIELD

The present disclosure relates to the field of display technologies, and in particular, relates to a method for processing three-dimensional (3D) image data, and a computer device.

BACKGROUND

At present, 3D display technology (also known as the light-field display technology) based on the integrated imaging has been commercially applied. A 3D display terminal based on the integrated imaging includes an optical lens array and a display panel, wherein the optical lens array is disposed on a light exit surface of the display panel. Each lens in the optical lens array corresponds to a plurality of sub-pixels. The main function of the lens is to project light form different sub-pixels to different directions to generate a plurality of viewpoints.

SUMMARY

Embodiments of the present disclosure provide a method for processing 3D image data, and a computer device. The technical solutions are as follows.

According to some embodiments of the present disclosure, a method for processing 3D image data is provided. The method is applicable to providing 3D image data to a 3D display terminal, wherein the 3D display terminal is provided with a plurality of viewpoints successively arranged, and a viewing region of the 3D display terminal includes a plurality of sub-regions, an arrangement direction of the plurality of sub-regions being consistent with an arrangement direction of the plurality of viewpoints, and the viewpoints corresponding to different sub-regions being at least partially different.

The method includes: receiving indication information, wherein the indication information is indicative of a number of target sub-regions, the target sub-region being a sub-region, where a viewer is present, in the viewing region; determining a target view based on the indication information, wherein a number of the target views determined in a case that the number of the target sub-regions is 1 is less than the number of the target views determined in a case that the number of the target sub-regions is greater than 1; and transmitting image data of the target view to the 3D display terminal.

In some embodiments, the plurality of viewpoints correspond to different views in one-to-one correspondence, and the number of the target sub-regions is greater than 1; and determining the target view based on the indication information includes: determining the views corresponding to the plurality of viewpoints as the target views.

In some embodiments, the plurality of viewpoints correspond to different views in one-to-one correspondence, and the number of the target sub-regions is 1; and determining the target view based on the indication information includes: determining a viewpoint used by the viewer of the 3D display terminal; and determining a view, in the views corresponding to the plurality of viewpoints, corresponding to the viewpoint used by the viewer as the target view.

In some embodiments, the indication information includes a viewing position of the viewer of the 3D display terminal, and the indication information is generated by the 3D display terminal in the case that the number of the target sub-regions is 1; and determining the viewpoint used by the viewer of the 3D display terminal includes: determining, according to a preset corresponding relationship between the viewpoint and the viewing position, a first viewpoint corresponding to the target sub-region; and determining the first viewpoint and N second viewpoints as the viewpoints used by the viewer, wherein the N second viewpoints are N viewpoints closest to the first viewpoint in the plurality of viewpoints; wherein N is an even number, and N is greater than or equal to 0.

In some embodiments, the indication information includes an identification of a target viewpoint, and the indication information is generated by the 3D display terminal in the case that the number of the target sub-regions is 1; and determining the viewpoint used by the viewer of the 3D display terminal includes: determining, based on the identification of the target viewpoint, the viewpoint used by the viewer of the 3D display terminal; wherein the target viewpoint includes a first viewpoint, or the target viewpoints includes the first viewpoint and N second viewpoints, wherein the first viewpoint is a viewpoint corresponding to the target sub-region, and the N second viewpoints are N viewpoints closest to the first viewpoint in the plurality of viewpoints, N being an even number and greater than or equal to 0; and the viewpoints used by the viewer include the first viewpoint and the N second viewpoints.

In some embodiments, transmitting the image data of the target view to the 3D display terminal includes transmitting image data of the target view with a first resolution to the 3D display terminal, in response to determining that the viewer is in a motion state; and transmitting image data of the target view with a second resolution to the 3D display terminal, in response to determining that the viewer is in a stationary state; wherein the first resolution is less than the second resolution.

In some embodiments, a resolution of the target sub-region determined in the case that the number of the target sub-regions is 1 is greater than a resolution of the target sub-region determined in the case that the number of the target sub-regions is greater than 1.

According to some embodiments of the present disclosure, a method for processing 3D image data is provided. The method is applicable to providing 3D image data to a plurality of 3D display terminals, wherein the plurality of 3D display terminals include a first display terminal and at least one second display terminal. The method includes: receiving first view angle indication information, wherein the first view angle indication information is indicative of a first view angle of the first display terminal for a target object; determining, based on the first view angle indication information, a first target view corresponding to the first view angle, wherein a number of the first target views is less than a number of viewpoints in the first display terminal; and transmitting image data of the first target view to the first display terminal and the at least one second display terminal.

In some embodiments, the first view angle indication information includes a viewing position of a viewer of the first display terminal; and determining, based on the first view angle indication information, the first target view corresponding to the first view angle includes: determining, according to a preset corresponding relationship between the viewpoint and the viewing position, a first viewpoint corresponding to the viewing position of the viewer of the first display terminal; and determining views corresponding to the first viewpoint and N second viewpoints as the first target views, wherein the N second viewpoints are N viewpoints closest to the first viewpoint in a plurality of viewpoints; wherein N is an even number, and N is greater than or equal to 0.

In some embodiments, the first view angle indication information includes an identification of a target viewpoint, wherein the target viewpoint includes a first viewpoint, or the target viewpoints include the first viewpoint and N second viewpoints, wherein the first viewpoint is a viewpoint corresponding to a viewing position of a viewer of the first display terminal, and the N second viewpoints are N viewpoints closest to the first viewpoint in a plurality of viewpoints, N being an even number, and N being greater than or equal to 0; and determining, based on the first view angle indication information, the first target view corresponding to the first view angle includes: determining, based on the identification of the target viewpoint, views corresponding to the first viewpoint and the N second viewpoints as the first target views.

In some embodiments, the method further includes: receiving second view angle indication information transmitted by a third display terminal, wherein the third display terminal is one of the at least one second display terminal, and the second view angle indication information is indicative of a second view angle of the third display terminal for the target object; determining, based on the second view angle indication information, a second target view corresponding to the second view angle; and transmitting image data of the second target view to the third display terminal.

According to some embodiments of the present disclosure, a computer device is provided. The computer device includes a processor and a memory. The memory is configured to store one or more computer programs. The processor, when loading and running the one or more computer programs, is caused to perform the method for processing 3D image data as described above, or the method for processing 3D image data as described above.

According to some embodiments of the present disclosure, a non-volatile computer-readable storage medium is provided. The non-volatile computer-readable storage medium stores one or more instructions. The one or more instructions, when loaded and executed by a processor of a computer device, cause the processor to perform the method for processing 3D image data as described above, or the method for processing 3D image data as described above.

According to some embodiments of the present disclosure, a computer program product is provided. The computer program product includes one or more instructions. The computer program product, when running on a computer, causes the computer to perform the method for processing 3D image data as described above, or the method for processing 3D image data as described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure is described in further detail with reference to the enclosed drawings, to clearly present the objects, technical solutions, and advantages of the present disclosure.

For clearer understanding of the embodiments of the present disclosure, a 3D display terminal based on the integrated imaging principle is described hereinafter first.

Figure 1:
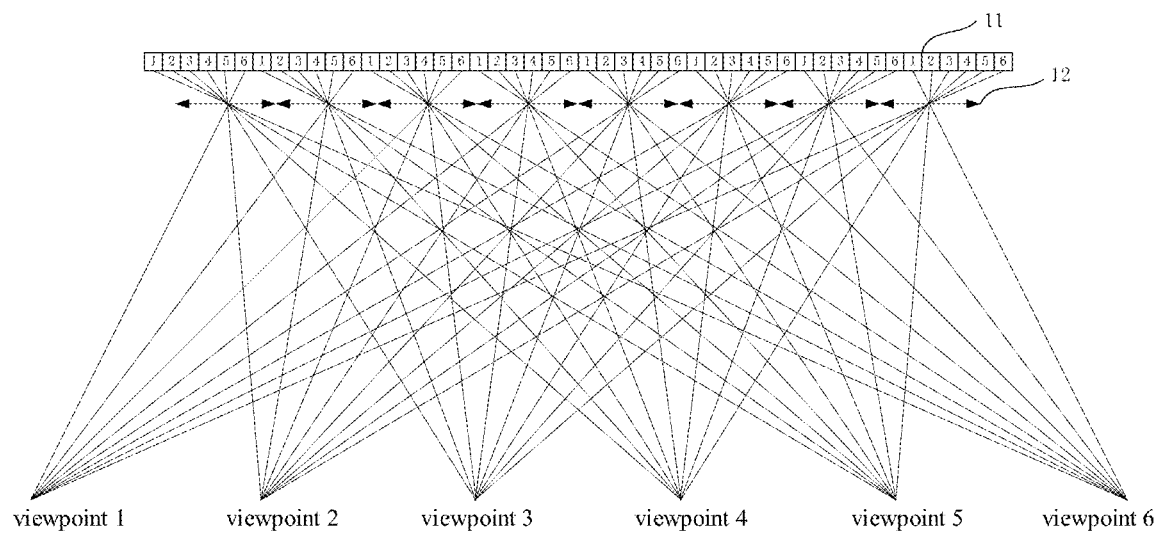
FIG. 1 is a schematic diagram of a working principle and a structure of a 3D display terminal according to some embodiments of the present disclosure.

FIG. 1 is a schematic diagram of a working principle and a structure of a 3D display terminal according to some embodiments of the present disclosure. Referring to FIG. 1, the 3D display terminal 10 includes a display panel 11 and a lens array 12. The lens array 12 is disposed on a light-exit surface of the display panel 11. Light from by the display panel 11 is output via the lens array 12.

The display panel 11 includes a plurality of pixels arranged in an array, and each of the plurality of pixels includes a plurality of sub-pixels. For example, each of the pixel includes three sub-pixels, namely a red sub-pixel, a blue sub-pixel, and a green sub-pixel. It should be noted that, the number and colors of the sub-pixels included in each of the pixels are not limited in the embodiments of the present disclosure, and may be set according to actual needs.

The lens array 12 includes a plurality of cylindrical lenses arranged in parallel, and each arrow in FIG. 1 represents one of the plurality of cylindrical lenses. In an arrangement direction of the plurality of cylindrical lenses (i.e., a left-right direction in FIG. 1), each of the cylindrical lenses 121 corresponds to a plurality of sub-pixels. The number of sub-pixels corresponding to each of the cylindrical lenses 121 is equal, and thus the sub-pixels of the display panel are divided into a plurality of groups. Each group of the sub-pixels corresponds to a viewpoint. A plurality of viewpoints arranged space apart along the arrangement direction a of the plurality of cylindrical lenses 121.

For example, in FIG. 1, the lens array includes eight cylindrical lenses, each of the cylindrical lenses corresponds to six pixels, and the pixels of the display panel are divided into six groups. The pixels numbered 1 constitute one of the groups, the pixels numbered 2 constitute one of the groups, . . . , and the like. The 3D display terminal includes six viewpoints.

It should be noted that, in the example shown in FIG. 1, the number of sub-pixels corresponds to each of the cylindrical lenses is an integer. In other exemplary embodiments, the number of sub-pixels corresponds to each of the cylindrical lenses is not an integer, but the number of sub-pixels corresponds to the plurality of cylindrical lenses (such as three cylindrical lenses) is an integer. In the embodiments of the present disclosure, a minimum lens combination corresponding to an integer number of sub-pixels is used as a period, and the number of viewpoints is equal to the number of sub-pixels corresponding to each period. The number of viewpoints of the 3D display terminal is not limited in the embodiments of the present disclosure.

The viewpoints correspond to different views in one-to-one correspondence. Referring to FIG. 1, the six viewpoints correspond to six views. The 3D display terminal is required to control, based on the composite image upon compositing the six views into one image, the pixels to emit light. The lens array modulates the light emitted by the pixels for viewpoint separation and convergence imaging. Information from a same viewpoint converge is converged into a region, and the region is referred as to a viewing region of the corresponding viewpoint. The viewing regions of viewpoints are discrete, but in human visual perception, the image is continuous.

Viewpoints correspond to left and right eyes are at least partially different in the case that a user is viewing, and views corresponding to different viewpoints are different. Therefore, images seen by the left and right eyes of the viewer have differences. Based on the principle binocular parallax, the viewer sees a 3D image.

Exemplarily, the display panel includes but not limited to a liquid crystal display panel, an organic light-emitting diode (OLED) display panel, and a quantum dot light-emitting diodes (QLED) display panel.

In the embodiments of the present disclosure, the 3D display terminal further includes a communication component, which is configured to communicate with a server and/or other terminals.

Optionally, the 3D display terminal further includes an interactive component, which is configured to interact with a user and receive operating instructions input by the user. The interactive component includes, but is not limited to, a pointing device, such as a mouse, a control boll, and a touchpad.

In the embodiments of the present disclosure, the 3D display terminal is a naked-eye 3D display terminal or a virtual reality (VR) glass.

In the embodiments of the present disclosure, the viewing region of the 3D display terminal is divided into a plurality of sub-regions, and an arrangement direction of the plurality of sub-regions is consistent with the arrangement direction of the plurality of viewpoints. The viewpoints corresponding to different sub-regions are at least partially different. That is, in the case that the viewer is in different sub-regions, the viewpoints used by the viewer are at least partially different. For example, referring to FIG. 1, for the naked-eye 3D display terminal, in the case that the viewer is in a first sub-region, the viewpoint corresponding to the left eye is the viewpoint 2, and the viewpoint corresponding to the right eye is the viewpoint 5; and in the case that the viewer is in a second sub-region, the viewpoint corresponding to the left eye is the viewpoint 3, and the viewpoint corresponding to the right eye is the viewpoint 6.

Figure 2:
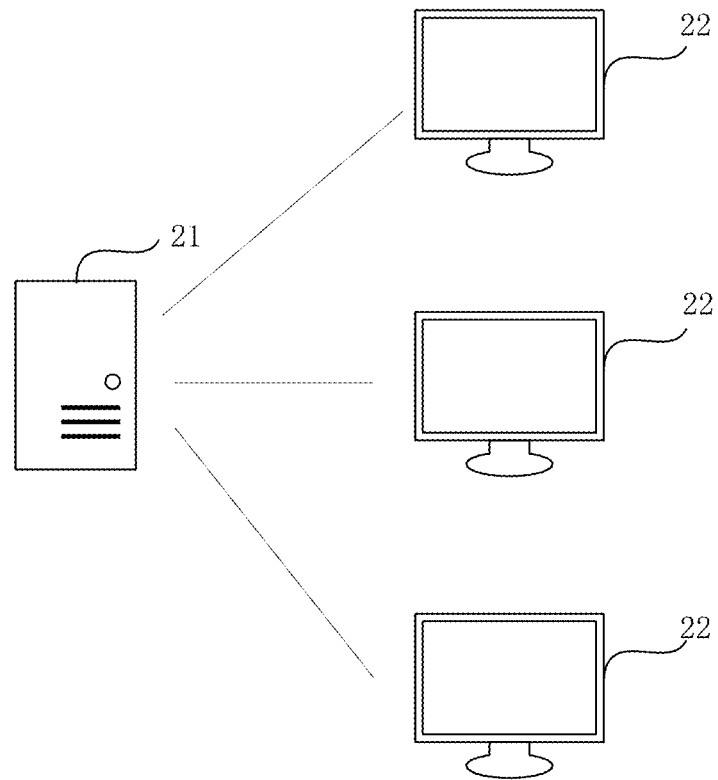
FIG. 2 is a schematic structural diagram of a display system according to some embodiments of the present disclosure.

FIG. 2 is a schematic structural diagram of a display system according to some embodiments of the present disclosure. Referring to FIG. 2, the display system includes a server 21 and a plurality of 3D display terminals 22. Each of the plurality of 3D display terminals 22 is connected to the server 21 over a network. The server 21 is a single server or a server cluster. The 3D display terminal 22 is the 3D display terminal shown in FIG. 1, which is not repeated herein.

Image data of a 3D image is stored in the server. The 3D display terminal transmits a request to the server to request the server to transmit the image data of the 3D image. The server transmits the image data to the 3D display terminal based on the request. The 3D display terminal displays the received image data, and thus the user views the corresponding 3D image.

In some embodiments. The request includes view angle information, and the view angle information is indicative of a target view angle. The image data transmitted by the server to the 3D display terminal is image data of the views corresponding to all the viewpoints under the target view angle. In this way, in the case that the user views at different viewpoints, the user views a 3D image of the corresponding view angle, and angles of the viewed target object are slightly different.

In the embodiments of the present disclosure, the server renders the view first, and transmits image data of the rendered image to the 3D display terminal.

The image data transmitted by the server to the 3D display terminal includes the image data of the views corresponding to all the viewpoints, and a data value of the image data is large. Therefore, the pressures on the data processing of the server and the network transmission are great.

Figure 3:
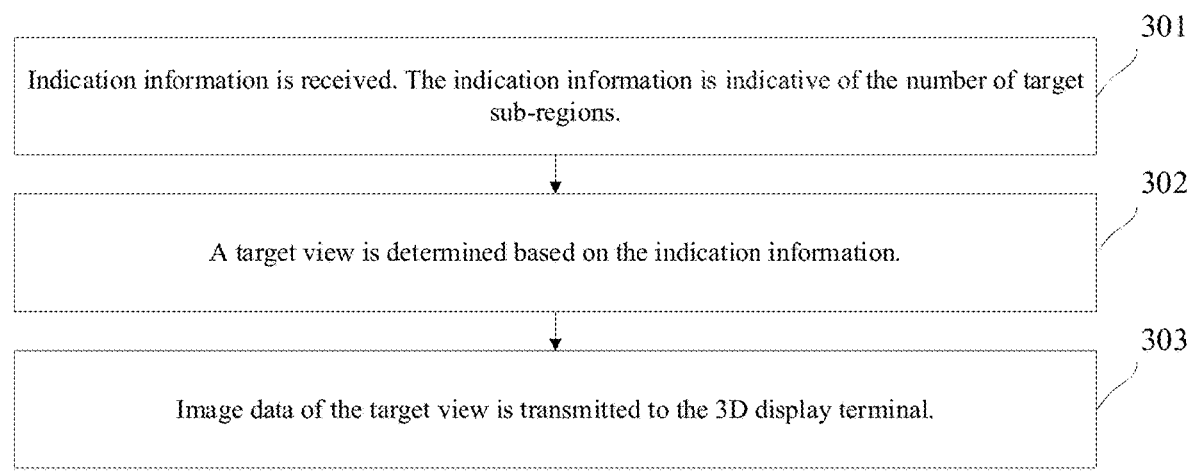
FIG. 3 is a flowchart of a method for processing 3D image data according to some embodiments of the present disclosure.

FIG. 3 is a flowchart of a method for processing 3D image data according to some embodiments of the present disclosure. The method is executed by the server. The method is applicable to providing the 3D image data to the 3D display terminal. The 3D display terminal is provided with the plurality of viewpoints successively arranged. The viewing region of the 3D display terminal includes the plurality of sub-regions, and the arrangement direction of the plurality of sub-regions is consistent with the arrangement direction of the plurality of viewpoints. The viewpoints corresponding to different sub-regions are at least partially different. Referring to FIG. 3, the method includes the following steps.

In step 301, indication information is received. The indication information is indicative of the number of target sub-regions. The target sub-region is a sub-region, where a viewer is present, in the viewing region.

The 3D display terminal is any one of the 3D display terminals shown in FIG. 2. The server receives the indication information transmitted by the 3D display terminal. The indication information is generated by the 3D display terminal based on the detected number of the viewers and the detected viewing positions. The way that the 3D display terminal determines the number of viewers and the viewing positions of the viewers is not limited in the embodiments of the present disclosure. The 3D display terminal uses technologies such as image identification or infrared induction to determine the number of viewers.

In some exemplary embodiments, the indication information includes a value. The value is equal to the number of target sub-regions, such as 1, 2, or 3. In other exemplary embodiments, the indication information includes an identifier corresponding to the number of target sub-regions. Different values of the identifier correspond to different intervals of the number. For example, in the case that the number of target sub-regions is 1, the identifier is a first value, such as "0;" and in the case that the number of target sub-regions is greater than 1, the identifier is a second value, such as "1."

In the above embodiments, the indication information directly or explicitly indicates the number of target sub-regions. In other embodiments, the indication information indirectly or implicitly indicates the number of target sub-regions. For example, in some exemplary embodiments, the indication information includes the viewing position of the viewer, and the indication information is generated by the 3D display terminal in the case that the number of target sub-regions is 1. For example, in other embodiments, the indication information includes an identification of the target viewpoint, and the indication information is generated by the 3D display terminal in the case that the number of target sub-regions is 1. Therefore, in the case that the server receives the indication information including the viewing position or the identification of the target viewpoint, the server determines, based on the indication information, that the number of target sub-regions of the 3D display terminal is 1.

In step 302, a target view is determined based on the indication information.

The number of target views determined in the case that the number of target sub-regions is 1 is less than the number of target views determined in the case that the number of target sub-regions is greater than 1.

In step 303, image data of the target view is transmitted to the 3D display terminal.

In the embodiments of the present disclosure, the server renders the target view first, and then transmits the image data of the rendered target view to the 3D display terminal. Upon receiving the image data, the 3D display terminal controls, based on the image data, the display panel to emit light, and thus the corresponding 3D image is displayed.

As described above, the 3D display terminal is provided with the plurality of viewpoints, and each of the viewpoints corresponds to one of the views. That is, different viewpoints correspond to different views. Different views are configured to display the 3D image. In the case that the viewers are more, they generally view the 3D image at different viewing positions. That is, for different sub-regions, the viewpoints correspond to the different sub-regions are at least partially different. Therefore, more viewpoints are used by the viewers, and in the case that the viewers are fewer, the number of viewpoints used by the viewers is less.

In the embodiments of the present disclosure, the target view is determined based on the number of target sub-regions of the display terminal, and the number of target views determined in the case that the number of target sub-regions is 1 is less than the number of target views determined in the case that the number of target sub-regions is greater than 1. In this way, in the case that the viewers are multiple and in the plurality of sub-regions, the image data of more views is transmitted to the display terminal, such that different viewers are able to view the images at different viewpoints, and thus viewing effects of the multiple viewers are ensured; and in the case that the number of viewer is 1 or the number of viewers is greater than 1 and in a same sub-region, the image data of fewer views is transmitted to the display terminal, such that in one aspect, a display effect is ensured in the case that the viewer views at the viewpoint corresponding to the received view, and in another aspect, because a data volume of the data corresponding to the view is small, pressures on the data processing of the server and the network transmission are reduced.

Figure 4:
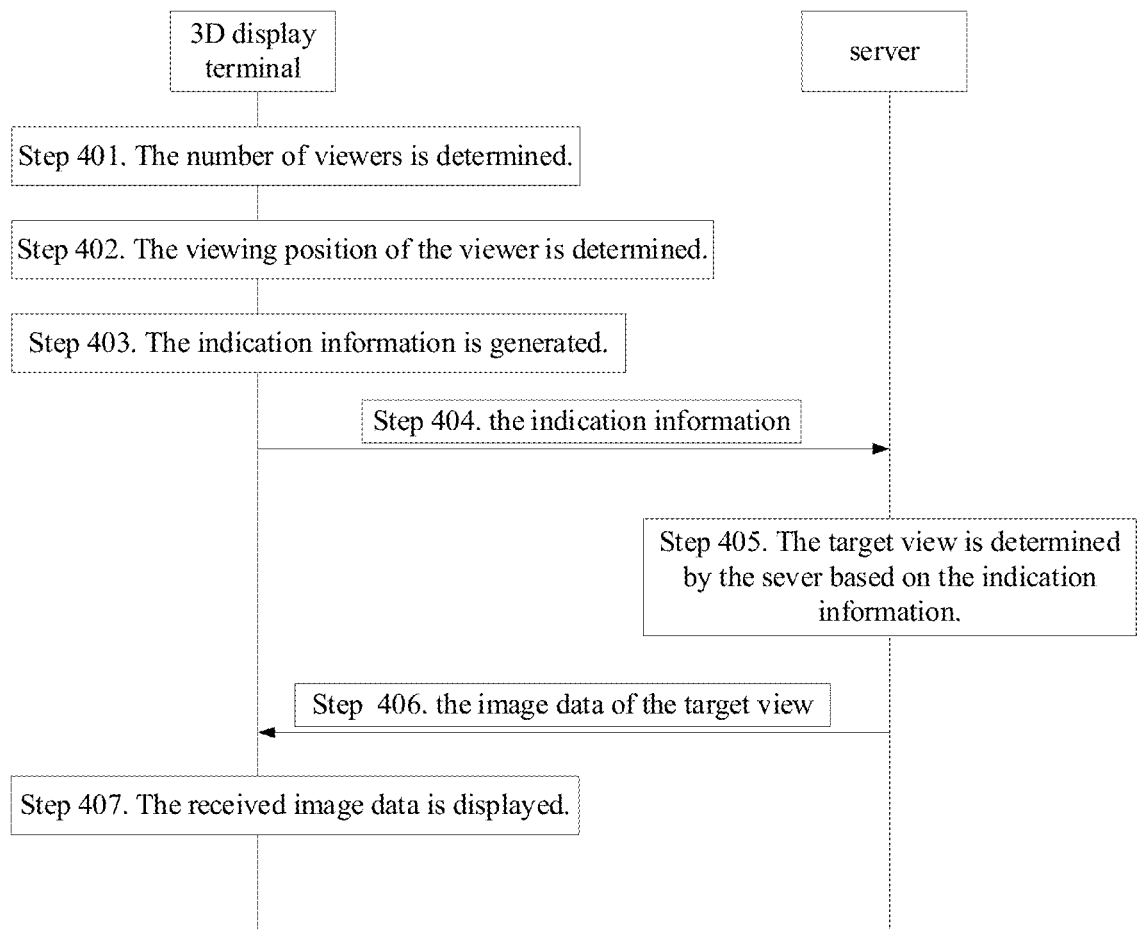
FIG. 4 is a flowchart of another method for processing 3D image data according to some embodiments of the present disclosure.

FIG. 4 is a flowchart of another method for processing 3D image data according to some embodiments of the present disclosure. The method is executed by both the 3D display terminal and the server. Referring to FIG. 4, the method includes the following steps.

In step 401, the number of viewers is determined by the 3D display terminal.

In some exemplary embodiments, the 3D display terminal includes an image acquisition device, such as a camera. Optionally, the camera includes one or a combination of more of a red-green-blue (RGB) camera, a depth camera, e.g., a time of flight (TOF) camera, a wide-angle camera, and a fisheye camera. The types, the number, and the mounting position of the cameras are arranged according to actual needs, which are not limited herein.

An image in the viewing region of the 3D display terminal is captured by the image acquisition device. The number of users in the image is determined by the image recognition technology, such as the face detection technology, and thus the number of viewers is determined.

In some exemplary embodiments, the following approach is employed to determine the number of viewers. First, faces in the image are recognized using the face detection technology; then, incomplete faces in the recognized faces are removed; and finally, the number of remaining faces is the number of viewers.

In some scenarios, a user who passes through the viewing region of the 3D display terminal but does not view the display content of the 3D display terminal is present. In a case that a view corresponding to a position of the user is determined as the target view, and image data of the view is transmitted to the 3D display terminal, the computer resources and network resources of the server are wasted. Therefore, such users need to be recognized and not regarded as the viewers of the display terminal. In general, a user who faces the 3D display terminal is capable of viewing the display content of the 3D display terminal. In a case that the recognized face is incomplete, the user does not face the 3D display terminal. That is, the user does not view the display content of the 3D display terminal. Therefore, such users are removed by removing the incomplete faces.

In other exemplary embodiments, the incomplete faces are not removed, and the number of faces present in the image is the number of viewers.

The way that the 3D display terminal determines the number of viewers is not limited by the embodiments of the present disclosure, as long as the number of viewers is determined. For example, in other exemplary embodiments, the 3D display terminal receives the number input by the user, and determines the received number as the number of viewers.

In step 402, the viewing position of the viewer is determined by the 3D display terminal.

Optionally, the viewing position of the viewer is determined by the 3D display terminal using a head tracking technology or an eye tracking technology.

In some exemplary embodiments, the 3D display terminal is the naked-eye 3D display terminal, and the viewing position of the viewer is a position where a reference point of a target part of the viewer is disposed. The target part is the head or eyes. Optionally, the viewing position of the viewer is a position of a center point of both eyes; or the viewing positions of the viewer include a position of the left eyeball and a position of the right eyeball.

In other exemplary embodiments, the 3D display terminal is a near-eye display terminal, such as a VR glass. In this case, the viewing positions of the viewer include a position of the left eyeball and a position of the right eyeball.

Optionally, the position is expressed by spatial coordinates, and the spatial coordinates are determined based on the image recognition technology. The coordinate system of the spatial coordinates takes the light exit surface of the display panel as the XY plane, that is, a plane of which the Z axis is 0. A direction perpendicular to the light exit surface is a direction of the Z axis, and the Z axis passes through a center of the display panel. Exemplarily, the X direction is a row direction of the pixels arranged in the display panel, and the Y direction of a column direction of the pixels arranged in the display panel. In the case that the display panel is placed vertically, the X direction is a horizontal direction and the Y direction is a vertical direction.

Optionally, the position is expressed by an angle relative a center surface of the 3D display terminal. The center surface is perpendicular to the arrangement direction of the cylindrical lenses, and perpendicular to the light exit surface of the display panel of the 3D display terminal. That is, the center surface is a vertical center surface in the case that the 3D display terminal is placed normally, that is, the YZ plane in the above coordinate system. The angle is an included angle between a vertical centerline (i.e., the Y axis) from the viewing position to the 3D display terminal and the center surface, and the angle is calculated according to spatial coordinates of the reference point.

In step 403, the indication information is generated by the 3D display terminal.

In a case that the number of viewers of the 3D display terminal is greater than 1 and the viewers of the 3D display terminal are in at least two of the sub-regions, then the 3D display terminal generates first indication information. The first information is indicative of that the number of target sub-regions is greater than 1.

Exemplarily, the first indication information is indicative of the value of the number of target sub-regions, or includes an indicator that is configured to indicate that the number of the target sub-regions is greater than 1.

In a case that the number of viewer of the 3D display terminal is 1, or and the number of viewers of the 3D display terminal is greater than 1 and the viewers of the 3D display terminal are in a same sub-region (which is considered at a same viewing position), then the 3D display terminal generates a second indication information. The second information includes the viewing positions of the viewers. In this case, the second indication information is indicative of that the number of target sub-regions is 1.

Herein, the target sub-region is the sub-region, where the viewers is present, in the viewing region.

In the embodiments of the present disclosure, in the case that the number of viewers is greater than 1, the number of target sub-regions is determined according to the viewing positions of the viewers.

The 3D display terminal is provided with the plurality of viewpoints successively arranged, and the viewing region of the 3D display terminal includes the plurality of sub-regions. The arrangement direction of the plurality of sub-regions is consistent with the arrangement direction of the plurality of viewpoints. The viewpoints corresponding to different sub-regions are at least partially different.

In some embodiments of the present disclosure, each of the sub-regions is a spatial region, and is expressed by spatial coordinates or an angular interval relative to a reference plane. The reference plane is the center surface of the 3D display terminal. The 3D display panel determines a spatial region where the position of each viewer is disposed, and determines the determined number of the spatial regions as the number of sub-regions.

In step 404, the indication information is transmitted by the 3D display terminal to the server.

Accordingly, the server receives the indication information.

In step 405, the target view is determined by the sever based on the indication information.

For the first indication information, step 405 includes: determining, by the server, the views corresponding to the viewpoints in the 3D display terminal as the target views. That is, the target views include the views corresponding to all the viewpoints of the 3D display terminal.

For the second indication information, step 405 includes: a first step of determining the viewpoints used by the viewer of the 3D display terminal; and a second step of determining the views corresponding to the viewpoints used by the viewer among the views corresponding to the plurality of viewpoints as the target views. That is, the target views include the views corresponding to a portion of the viewpoints of the 3D display terminal.

Therefore, in the embodiments, the number of target views in the case that the number of target sub-regions is 1 is less than the number of target views in the case that the number of target sub-regions is greater than 1.

In some exemplary embodiments, determining the viewpoints used by the viewer of the 3D display terminal includes: determining, according to a preset corresponding relationship between the viewpoint and the viewing position, a first viewpoint corresponding to the target sub-region; and determining the first viewpoint and N second viewpoints as the viewpoint used by the viewer, wherein the N second viewpoints are N viewpoints closest to the first viewpoint in the plurality of viewpoints. N is an even number, and N is greater than or equal to 0.

Exemplarily, the corresponding relationship is stored as a list.

In the embodiments of the present disclosure, the first viewpoint is referred to as a center viewpoint. In the corresponding relationship, one of the viewing positions corresponds to one or more the first viewpoints.

For example, in the case that the 3D display terminal is the naked-eye 3D display terminal and the viewing position is a center position between both eyes, then the viewing position corresponds to a pair of the first viewpoints, and two first viewpoints in each pair of the first viewpoints respectively correspond to the left eye and the right eye of the viewer. For example, in the case that the 3D display terminal is the naked-eye 3D display terminal and the viewing positions include the position of the left eyeball and the position of the right eyeball, then each of the viewing positions corresponds to one of the first viewpoints.

In the case that the 3D display terminal is the near-eye display terminal and the viewing positions of the viewer include the position of the left eyeball and the position of the right eyeball, then each of the viewing position corresponds to the plurality of first viewpoints. For example, each of the viewing position corresponds to 2 or 3 of the first viewpoints.

In some exemplary embodiments, the corresponding relationship is a corresponding relationship between the viewpoint and the angle. In the corresponding relationship between the viewpoint and the angle, each of the viewpoints corresponds to the angle. The viewing position instructed by the indication information is expressed by the angle relative to the center surface of the 3D display terminal. The server first determines a target angle closest to the angle corresponding to the viewing position from the corresponding relationship between the viewpoint and the angle, and then determines the viewpoint corresponding to the target angle in the corresponding relationship as the first viewpoint.

Figure 5:
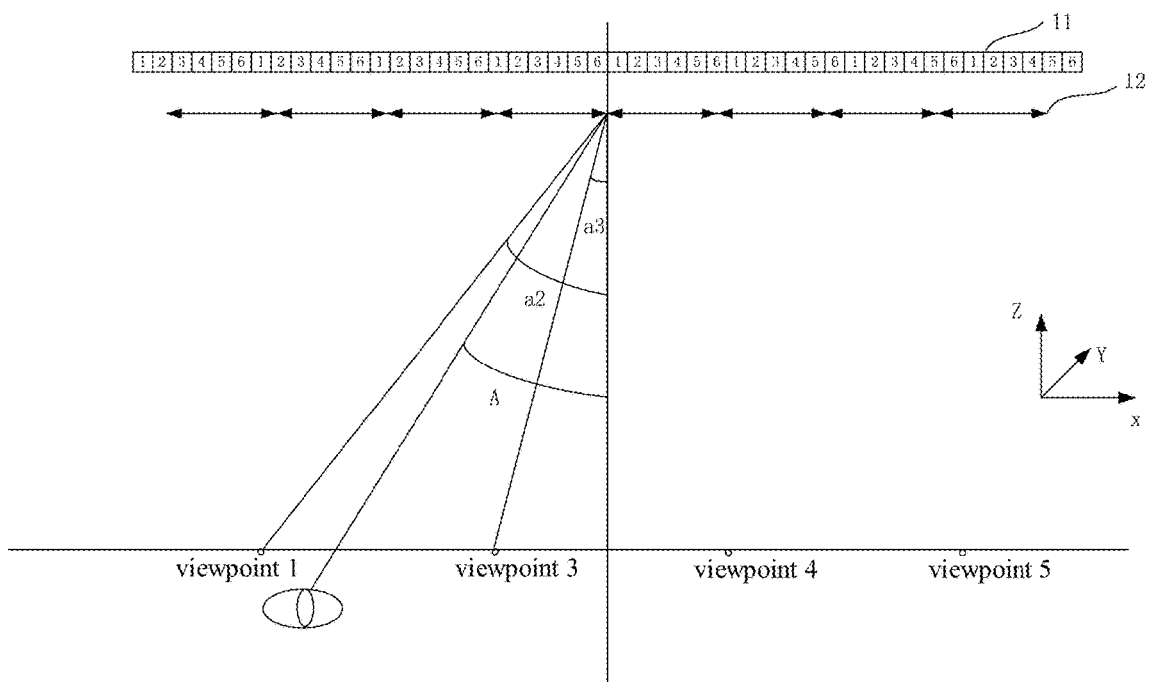
FIG. 5 is a schematic diagram of a relation between a viewing position and a viewpoint according to some embodiments of the present disclosure.

Exemplary description of how to determine the first viewpoint is given combining with FIG. 5. Referring to FIG. 5, the angle corresponding to the viewpoint 2 is a2, and the angle corresponding to the viewpoint 3 is a3. Then in the corresponding relationship between the viewpoint and the angle includes . . . (the viewpoint 2, a2), (the viewpoint 3, a3) . . . , the angle corresponding to the left eye is A. In the corresponding relationship, the angle closest to A is a2, and then the viewpoint 2 corresponding to a2 is determined as the first viewpoint corresponding to the left eye.

In other exemplary embodiments, the corresponding relationship is a corresponding relationship between the viewpoint and the angle interval. The viewing position instructed by the indication information is expressed by the angle relative to the center surface of the 3D display terminal. The server first determines a target angle interval where the angle corresponding to the indication information is disposed, and then determines the viewpoint corresponding to the target angle interval in the corresponding relationship as the first viewpoint. Exemplarily, the sub-region and the angle interval are in one-to-one correspondence.

In other exemplary embodiments, the corresponding relationship is the corresponding relationship between the viewpoint and the angle interval or the corresponding relationship between the viewpoint and the angle. The viewing position instructed by the indication information is expressed by the spatial coordinates. Then the server converts the spatial coordinates into the angle relative to the center surface of the 3D display terminal, and determines the first viewpoint according to the angle corresponding to the indication information and the corresponding relationship.

In the embodiments of the present disclosure, prior to performing the method, the 3D display terminal is required to pre-store the corresponding relationship between the viewpoint and the angle interval in the server. For example, a mapping between a type of the 3D display terminal and the corresponding relationship is pre-stored in the server. In this way, the server acquires the corresponding relationship according to the type of the 3D display terminal.

A value of N is determined according to parameters of an optical system of the 3D display terminal. For example, in a case that the light crosstalk of the 3D display terminal is serious, the value of N is great, such as 4. In a case that the light crosstalk of the 3D display terminal is slight, the value of N is small, such as 2. In the embodiments of the present disclosure, the N second viewpoints are disposed symmetrically on both sides of the corresponding first viewpoint.

It should be noted that, the N second viewpoints and the corresponding first viewpoint are viewpoints in a same visual region; or, a portion of the N second viewpoints are viewpoints in a visual region adjacent to the visual region where the first viewpoint is disposed. Herein, a region where all the sub-pixels of the display panel are emitted and imaged through the opposite lens is referred to as a main lobe region, and a region where all the sub-pixels of the display panel are imaged through the non-opposite lens is referred to as a side lobe region. Each of the main lobe region and the side lobe region is a visual region. In the case that the first viewpoints are viewpoints disposed on both sides of the main lobe region, a portion of the second viewpoints corresponding to the first viewpoints are viewpoints in the side lobe region adjacent to the main lobe region.

Alternatively, in other embodiments, the second indication information does not include the viewing position of the viewer, but includes the identification of the target viewpoint. The target viewpoint includes the first viewpoint, or the target viewpoint includes the first viewpoint and the N second viewpoints. The first viewpoint is the viewpoint corresponding to the target sub-region, and the N second viewpoints are N viewpoints closest to the first viewpoint in the plurality of viewpoints. N is an even number, and N is greater than or equal to 0.

In this case, the way to determine the viewpoint used by the viewer of the 3D display terminal is replaced by the following way. The viewpoint used by the viewer of the 3D display terminal is determined based on the identification of the target viewpoint. The viewpoints used by the viewer includes the first viewpoint and the N second viewpoints.

It should be noted that, in the embodiments, two cases where the number of target sub-regions is 1 and the number of target sub-regions is greater than 1 are distinguished. In the case that the number of target sub-regions is greater than 1, the views corresponding to the viewpoints in the 3D display terminal are directly determined as the target views, and thus an implementation process is simplified. In other embodiments, in the case that the number of target sub-regions is greater than 1, the number of target views is determined according to actual numbers. For example, the number of target views is positively correlated with the number of target sub-regions. That is, the more the number of target sub-regions is, the more the number of target views is. In the case that the number of target sub-regions reaches a set upper limit value, the views corresponding to the viewpoints in the 3D display terminal are determined as the target views.

In step 406, the image data of the target view is transmitted by the server to the 3D display terminal.

Optionally, the server stores image data of the target view with at least one resolution, or renders the target view based on at least one resolution and acquires the image data of the target view with the corresponding resolution.

In some embodiments, the server transmits the image data of the target view with a default resolution or a specified resolution to the 3D display terminal.

In other embodiments, the second indication information is further configured to instruct that the number of viewers is 1. In this case, the server selects, according to viewing state of the viewer of the 3D display terminal, the image data of the target view with a corresponding resolution, and transmits the image data to the 3D display terminal. For example, in the case that the viewer is in a motion state, image data of a target view with a first resolution is transmitted to the 3D display terminal. For example, in the case that the viewer is in a stationary state, image data of a target view with a second resolution is transmitted to the 3D display terminal. The first resolution is lower than the second resolution.

In this way, the viewer in the stationary state is capable of viewing an image with a high resolution, such that a clarity of a 3D image is improved. In addition, for the viewer in the motion state, an image the viewer viewed is still blurred even though the image with a high resolution. Therefore, image data of a target view with a low resolution is transmitted to reduce the pressure on the network transmission.

In some exemplary embodiments, in a case that the indication information includes the viewing position of the viewer, then the server determines the viewing state of the viewer based on recently received X viewing positions, and X is an integer and X is greater than or equal to 2. In a case that the X viewing positions are different, or a deviation value between any two viewing positions in the X viewing positions is greater than a threshold value, then the viewer is determined in the motion state. In a case that the X viewing positions are consistent, or the deviation value between the any two viewing positions in the X viewing positions is not greater than the threshold value, and then the viewer is determined in the stationary state. Exemplarily, X is 2 or 3.

In other exemplary embodiments, in a case that the indication information includes the identification of the target viewpoint, then the server determines the viewing state of the viewer based on the identification of the target viewpoints in recently received Y indication information, and Y is an integer and Y is greater than or equal to 2. In a case that the identification of the target viewpoints in the Y indication information is different, or the identification of the target viewpoints in the Y indication information is at least partially different, then the viewer is determined in the motion state. In a case that the identification of the target viewpoints in the Y indication information is consistent, and then the viewer is determined in the stationary state. Exemplarily, X is 2 or 3.

In still other exemplary embodiments, in a case that a network quality is poor, for example, a transmission rate corresponding to the 3D display terminal is less than a threshold, and/or a transmission bandwidth of the 3D display terminal is less than a threshold, then the server selects the resolution of the target view based on the determined number of the target views, such that the resolution of the target view determined in the case that the number of target sub-regions is 1 is greater than the resolution of the target view determined in the case that the number of target sub-regions is greater than 1.

For example, in the case that the views corresponding to the plurality of viewpoints are determined as the target views, the resolution of the target view is a third resolution. In the case that the views corresponding to the viewpoints used by the viewer are determined as the target views, the resolution of the target view is the second resolution, and the third resolution is less than the second resolution. A data volume of image data of a view with a low resolution is small, and therefore, in the case that the number of target views is great, an overall data volume of the image data of the target view is reduced by reducing the resolution of the target view, and thus the pressure on the network transmission is reduced.

Certainly, in some embodiments, the network quality is not considered, such that the resolution of the target view determined in the case that the number of target sub-regions is 1 is equal to the resolution of the target view determined in the case that the number of target sub-regions is greater than 1.

In step 407, the image data is received by the 3D display terminal.

In the case the viewer is in the motion state, the 3D display terminal displays the target view with the first resolution at a first refresh rate; and in the case that the viewer is in the stationary state, the 3D display terminal displays the target view with the second resolution at a second refresh rate. Herein, the first refresh rate is greater than the second refresh rate. In this way, a fluency of the image viewed by the viewer in the motion state is improved.

In the embodiments of the present disclosure, the target view is determined based on the number of target sub-regions of the display terminal, and the number of target views determined in the case that the number of target sub-regions is 1 is less than the number of target views determined in the case that the number of target sub-regions is greater than 1. In this way, the image data of more views is transmitted to the display terminal in the case that the viewers are multiple and are in the plurality of sub-regions, such that different viewers are capable of viewing the images at different viewpoints, and thus the viewing effects of the multiple viewers are ensured. The image data of fewer views is transmitted to the display terminal in the case that the number of viewer is 1 or the number of viewers is greater than 1 and in a same sub-region, such that in one aspect, the display effect is ensured in the case that the viewer views at the viewpoint corresponding to the received view, and in another aspect, because the data volume corresponding to the view is small, pressures on the data processing of the server and the network transmission are reduced.

In addition, by indirectly instructing the number of target sub-regions through the indication information including the viewing position of the viewer, the server is capable of determining both the number of target sub-regions based on the indication information and the viewing state of the viewer based on the indication information. In this way, an information interaction between the server and the 3D display terminal is reduced, and thus the pressure on the network transmission is further reduced.

Figure 6:
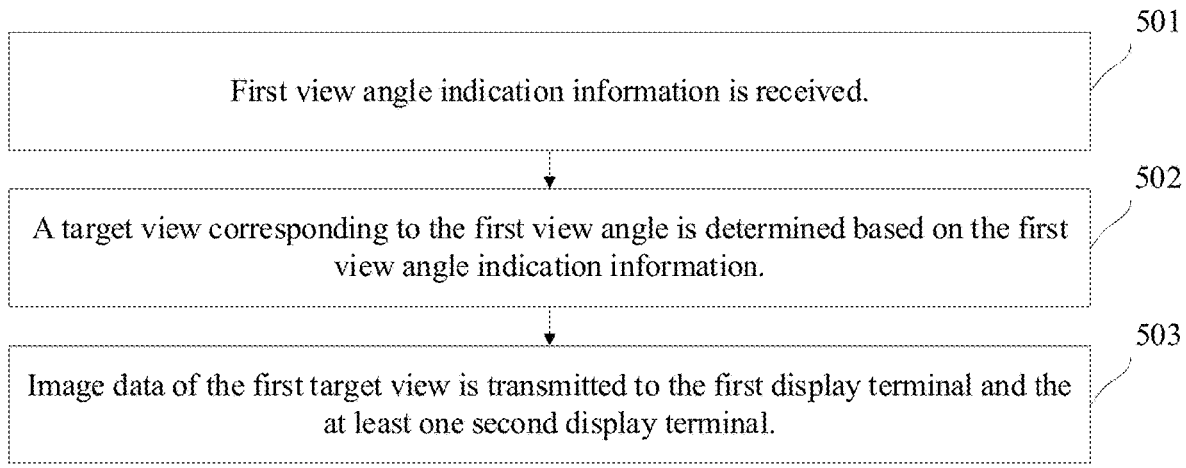
FIG. 6 is a flowchart of still another method for processing 3D image data according to some embodiments of the present disclosure.

FIG. 6 is a flowchart of still another method for processing 3D image data according to some embodiments of the present disclosure. The method is executed by the server. The method is applicable to providing the 3D image data to the plurality of 3D display terminals. The plurality of 3D display terminals include a first display terminal and at least one second display terminal. Referring to FIG. 6, the method includes the following steps.

In step 501, first view angle indication information is received.

The first view angle indication information is indicative of a first view angle of the first display terminal for the target object.

In step 502, a target view corresponding to the first view angle is determined based on the first view angle indication information.

In some exemplary embodiments, the number of first target views is less than the number of viewpoints in the first display terminal. Compared with transmitting the image data of the views corresponding to all the viewpoints, the data volume of the image data is reduced by transmitting the data image of the views corresponding to a portion of the viewpoints to the first display terminal and the second display terminal for display, and thus pressures on the image processing of the server and the network transmission are reduced.

In step 503, image data of the first target view is transmitted to the first display terminal and the at least one second display terminal.

By simultaneously transmitting the image data of the first target view to the first display terminal and the at least one second display terminal, that is, by transmitting image data of a same view to the first display terminal and the second display terminal, the first display terminal and the second display terminal display synchronously. Moreover, the target view is determined based on the first view angle indication information corresponding to the first display terminal. In this way, it is ensured that a content displayed by the second display terminal follows a content displayed by the first display terminal, which is applied in teaching scenarios, conferencing scenarios, and live streaming scenarios.

Figure 7:
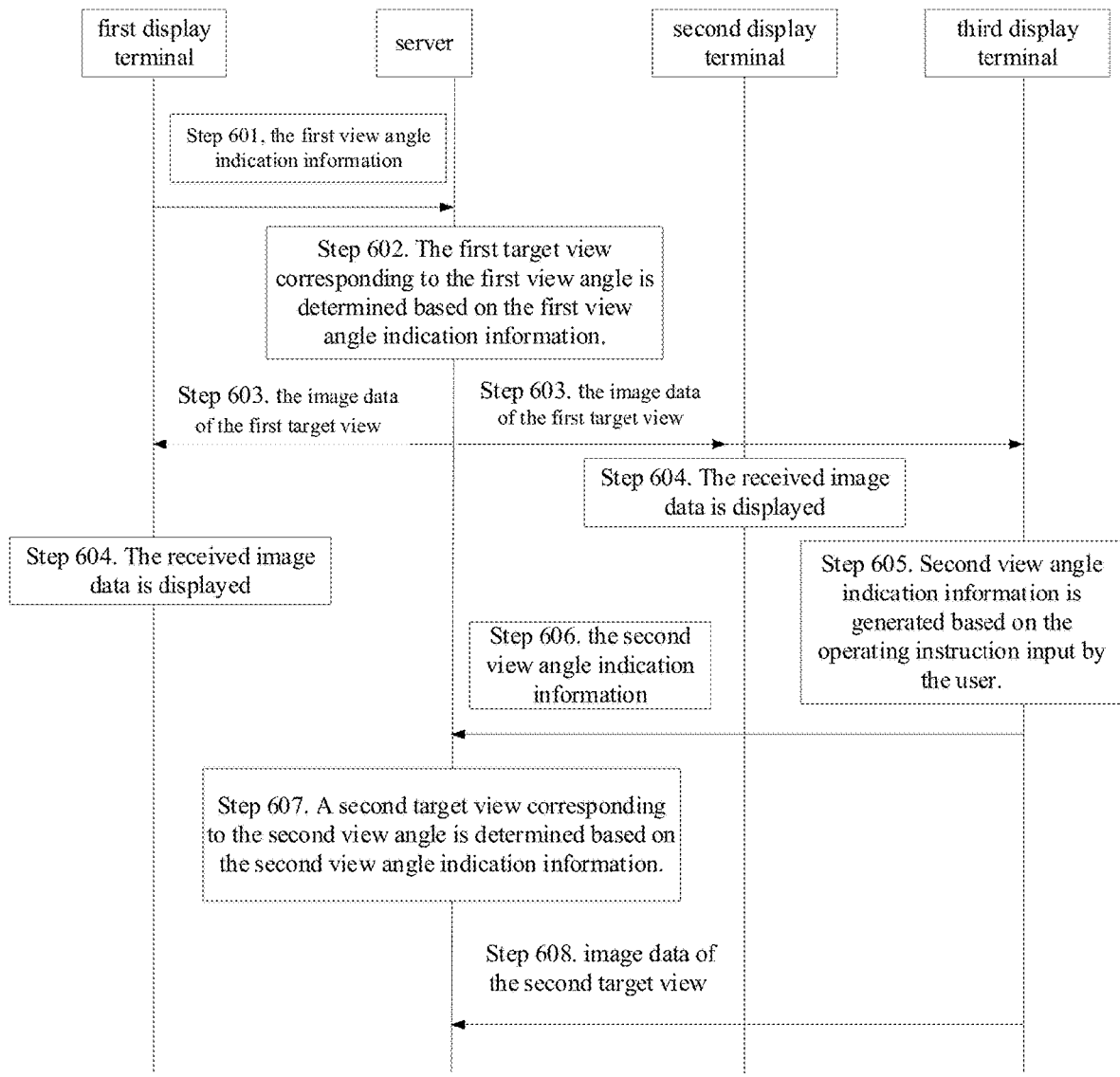
FIG. 7 is a flowchart of still another method for processing 3D image data according to some embodiments of the present disclosure.

FIG. 7 is a flowchart of still another method for processing 3D image data according to some embodiments of the present disclosure. Referring FIG. 7, the method is performed by the first display terminal, the server, and the second display terminal. The first display terminal and the second display terminal are the 3D display terminals shown in FIG. 2. The method includes the following steps.

In step 601, the first view angle indication information is transmitted by the first display terminal.

Accordingly, the first view angle indication information is received by the server.

The first view angle indication information is indicative of the first view angle of the first display terminal for the target object.

In some exemplary embodiments, the first view angle indication information directly indicates the first view angle, for example, the first view angle indication information includes a view angle of a viewer of the first display terminal. Alternatively, the first view angle indication information indirectly instructs the first view angle, for example, the first view angle indication information includes a viewing position of the viewer of the first display terminal, or a viewpoint corresponding to the viewing position of the viewer of the first display terminal.

In some exemplary embodiments, the first view angle indication information is generated according to the viewing position of the viewer of the first display terminal.

In other exemplary embodiments, the first view angle indication information is generated by the first display terminal according an operating instruction input by a user. The operating instruction is indicative of a first view angle selected by the user. A way the user inputs the operating instruction is not limited herein, including but not limited to, voice input, gesture input, and touch screen input.

For detailed description of the first view angle indication information, reference may be made to the second indication information described in step 403, which are not repeated herein.

In step 602, the first target view corresponding to the first view angle is determined by the server based on the first view angle indication information.

In some exemplary embodiments, the number of first target views is less than the number of viewpoints in the first display terminal. Compared with transmitting the image data of the views corresponding to all the viewpoints, the data volume of the image data is reduced by transmitting the data image of the views corresponding to a portion of the viewpoints to the first display terminal and the second display terminal for display, and thus pressures on the image processing of the server and the network transmission are reduced.

In some embodiments, the first view angle indication information includes the viewing position of the viewer of the first display terminal. Step 602 includes: determining, according to the preset corresponding relationship between the viewpoint and the viewing position, the first viewpoint corresponding to the viewing position of the viewer of the first display terminal; and determining the views corresponding to the first viewpoint and the N second viewpoints as the first target views. The N second viewpoints are N viewpoints closest to the first viewpoint in the plurality of viewpoints, wherein N is an even number, and N is greater than or equal to 0.

In some exemplary embodiments, a first viewpoint information includes the identification of the target viewpoint. The target viewpoint includes the first viewpoint, or the target viewpoint includes the first viewpoint and the N second viewpoints. The first viewpoint is the viewpoint corresponding to the viewing position of the viewer, and the N second viewpoints are N viewpoints closest to the first viewpoint in the plurality of viewpoints, wherein N is an even number, and N is greater than or equal to 0. Step 602 includes: determining the views corresponding to the first viewpoints and the N second viewpoints as the first target views.

For related contents, reference may be made to step 405, which are not repeated herein.

In step 603, the image data of the first target view is transmitted by the server to the first display terminal and the at least one second display terminal.

In step 604, the received image data is displayed by the first display terminal and the second display terminal.

By simultaneously transmitting the image data of the first target view to the first display terminal and the at least one second display terminal, that is, by transmitting the image data of the same view to the first display terminal and the second display terminal, the first display terminal and the second display terminal display synchronously. Moreover, the target view is determined based on the first view angle indication information corresponding to the first display terminal. In this way, it is ensured that the content displayed by the second display terminal follows the content displayed by the first display terminal.

Moreover, angles (or pictures) of the 3D images viewed viewers at different viewpoints are different. Therefore, in the case that the first display terminal only has a viewer and the first target view corresponds to the viewing position of the viewer of the first display terminal, by transmitting the image data of the first target view to the first display terminal, a viewer of the second display terminal is required to be at the corresponding position to view the image clearly. In this way, a content viewed by the viewer of the second display terminal is highly consistent with a content viewed by the viewer of the first display terminal.

In some scenarios, at least one of the second display terminals is required to view a three-dimension image of a different viewpoint without affecting the first display terminal and other of the second display terminals. In this case, the method further includes the following steps.

In step 605, second view angle indication information is generated by a third display terminal based on the operating instruction input by the user.

The third display terminal is one of the at least one second terminal, and the second view angle indication information is indicative of a second view angle of the third display terminal for the target object.

For the way of inputting the operating instruction, reference may be made to step 601, which is not repeated herein.

In step 606, the second view angle indication information is transmitted by the third display terminal to the server.

Accordingly, the second view angle indication information transmitted by the third display terminal is received by the server.

In step 607, a second target view corresponding to the second view angle is determined by the server based on the second view angle indication information.

For implementation of step 607, reference may be made to step 602, which is not repeated herein, In step 608, image data of the second target view is transmitted by the server to the third display terminal.

The image data of the second target view is received by the third display terminal. Upon receiving the image data of the second target view, the third display terminal controls, based on the received image data, the display panel to emit light to display a corresponding 3D image. The first display terminal and other display terminals still display 3D images based on the image data of the first target view. In this way, the third display terminal displays the 3D image that is different from the 3D images displayed by the first display terminal and other second display terminals, such that an asynchronously display is achieved.

Optionally, the first view angle indication information is further indicative of whether synchronous display or not. In the case that the first view angle indication information indicates a synchronous display, the step 603 and step 604 are performed. In the case that the first view angle indication information indicates an asynchronous display, step 603 and step 604 are replaced by the following step. The image data of the first target view is transmitted by the server to the first display terminal, and the received image data is displayed by the first display terminal.

It should be noted that, the method further includes: prior to step 601, an association relationship is established by the server between the plurality of display terminals; and the first display terminal and the second display terminal are determined from the plurality of display terminals.

In the embodiments of the present disclosure, a way of establishing the association relationship includes but is not limited to: joining the plurality of display terminals to a same group, or joining the plurality of display terminals to a same conference.

Optionally, the first display terminal is fixed. For example, a same 3D display terminal is always used as the first display terminal until the group dissolves or the conference ends. In some exemplary embodiments, the server determines the 3D display terminal corresponding to an establisher of the group or an initiator of the conference as the first display terminal. In other exemplary embodiments, the server determines the first display terminal based on identify information of the user of the 3D.

Alternatively, the first display terminal is variable. For example, the server determines, according to a predetermined rule, the first display terminal from the plurality of 3D display terminals that have the association relationship until the group dissolves or the conference ends, such as determining the 3D display terminal used by a user currently speaking as the first display terminal.

In the plurality of 3D display terminals, other 3D display terminals expect for the first display terminal are the second display terminals. The number of second display terminals is not limited herein.

Figure 8:
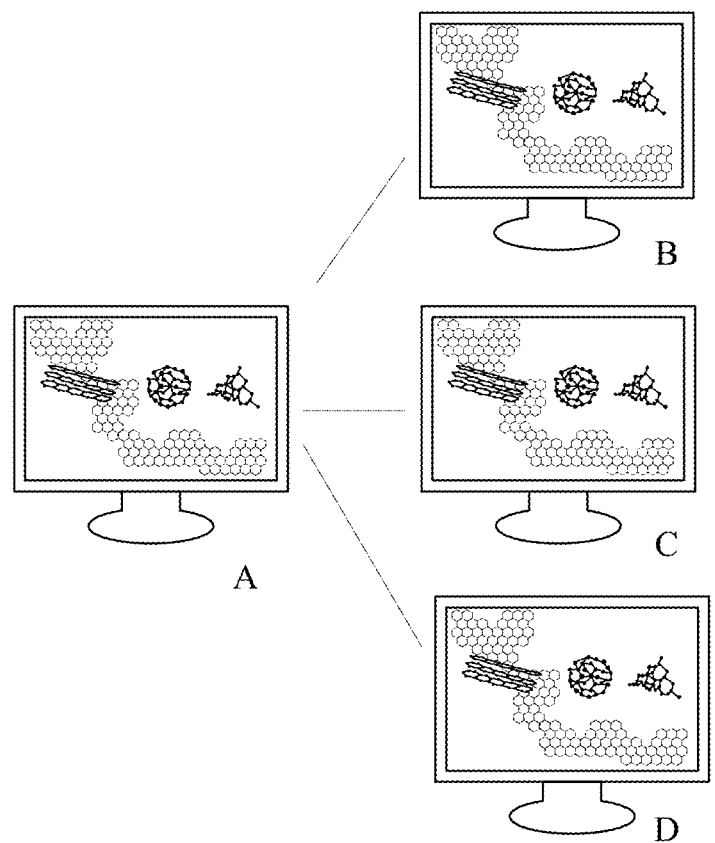
FIG. 8 is a schematic diagram of an application scenario according to some embodiments of the present disclosure.
Figure 9:
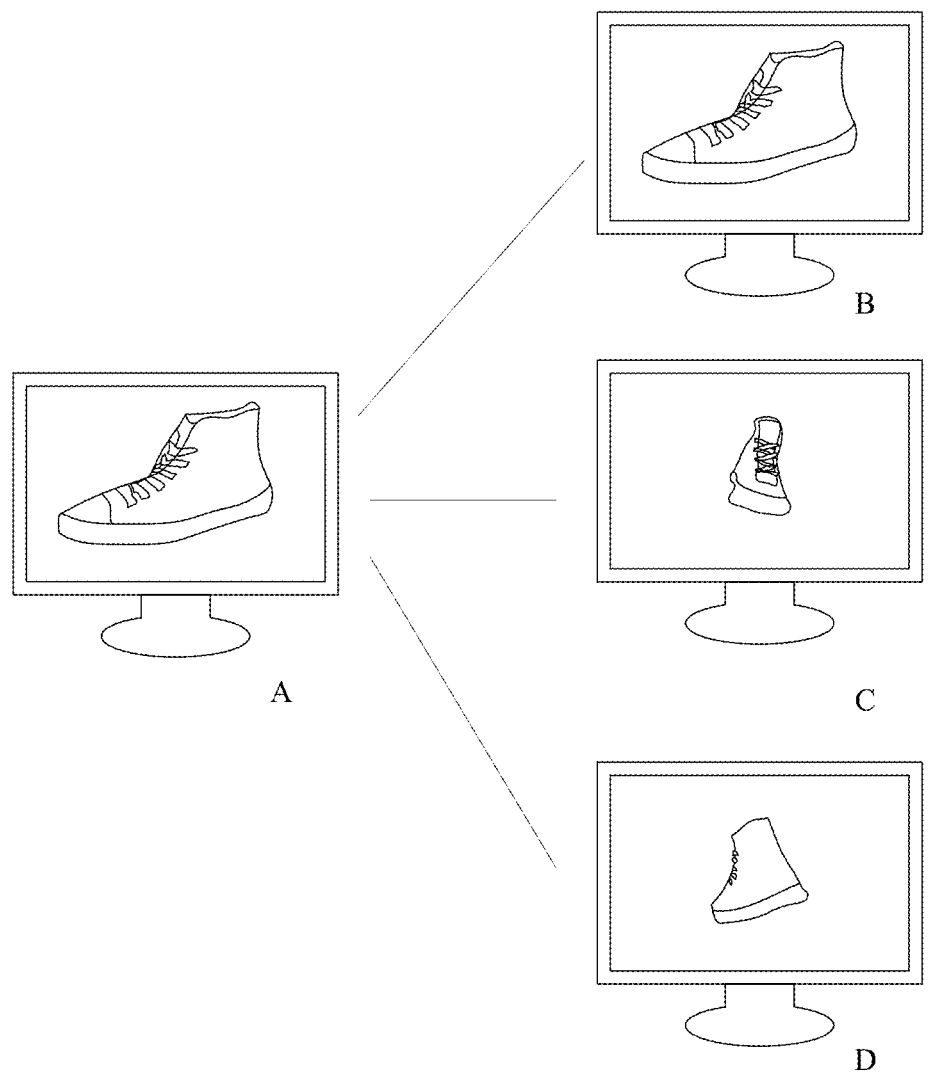
FIG. 9 is a schematic diagram of another application scenario according to some embodiments of the present disclosure.

Exemplary description of application scenarios of the method shown in FIG. 7 is given combining with FIG. 8 and FIG. 9.

Referring to FIG. 8, in a teaching scenario, a first display terminal A is a terminal used by a lecturer, and second display terminals B, C, and D are terminals used by listeners. The server (not shown in FIG. 8) determines, by the first display terminal A, an angle specified by the lecturer and a viewpoint used by the lecturer. Then the server uniformly pushes a current teaching content, such as chemical molecular structures, to the first display terminal A and the second display terminals B, C, and D to ensure that the listeners and the lecturer view a 3D module from a same angle.

In a conference scenario, the first display terminal is a 3D display terminal used by the currently speaker, and other 3D display terminals are the second display terminals. Each 3D display terminal performs a voice detection, and in the case that the voice input is detected, transmits a request to the server. The server determines a 3D display terminal corresponding to the received request as the first display terminal.

Taking a conference to discuss a design proposal as an example, in a proposal presentation session, a 3D display terminal A is a 3D display terminal used by the presenter, that is the first display terminal. Other 3D display terminals B, C, and D are the second display terminals. The 3D display terminal A displays a front, a side, a top angle, and a cross section of an object one-by-one according to a current sharing progress of the presenter. The server synchronously pushes a content displayed by the 3D display terminal A to the 3D display terminals B, C, and D, such that a synchronous display is achieved. In this process, in a case a user of the 3D display terminal C (the third display terminal) wants to observe an angle in detail, then the user sends the second view angle indication information to the server and does not share the angle used by himself. The server transmits the image data of the view corresponding to the second view angle indication information to the 3D display terminal C, and then the 3D display terminal C displays asynchronously.

In a question discussion session, a 3D display terminal used by the speaker is the first display terminal, and the first display terminal changes as the speaker switches. In the case that a user of the three-dimension displays terminal D speaks, the 3D display terminal D changes to the first display terminal. The server transmits image data of a corresponding view to the 3D display terminals based on a view angle selected by the 3D display terminal D, and synchronizes the image data of the corresponding view to the 3D display terminals A, B, and C.

In a live streaming scenario, a display terminal used by an anchorman is the first display terminal, and terminals used by a viewer is the second display terminal. In the case that a user corresponding to the second display terminal enters a live streaming room for the first time, the server transits image data of a view angle consistent with the first display terminal to the second display terminal, and a synchronous sharing is achieved. The user of the second display terminal selects a view angle that he or she wants to view, and sends a view angle indication information to the sever. The server adjusts, based on the received view angle indication information, the angle corresponding to image data of the second display terminal, such that the second display terminal displays the image at the view angle that the user wants to view without affecting other second display terminals, and the asynchronous display is achieved.

Figure 10:
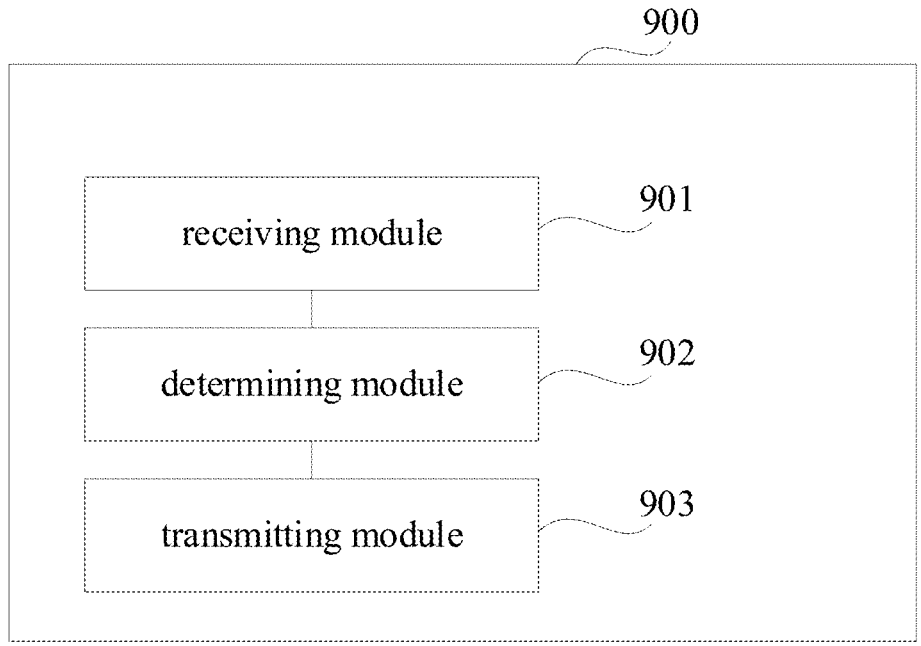
FIG. 10 is a block diagram of an apparatus for processing 3D image data according to some embodiments of the present disclosure.

FIG. 10 is a block diagram of an apparatus for processing 3D image data according to some embodiments of the present disclosure. Referring to FIG. 10, the apparatus 900 is applicable to providing 3D image data to a 3D display terminal. The 3D display terminal is provided with a plurality of viewpoints successively arranged, and a viewing region of the 3D display terminal includes a plurality of sub-regions. An arrangement direction of the plurality of sub-regions is consistent with an arrangement direction of the plurality of viewpoints. The viewpoints corresponding to different sub-regions are at least partially different. The apparatus 900 includes: a receiving module 901, a determining module 902, and a transmitting module 903.

The receiving module 901 is configured to receive indication information, and the indication information is indicative of the number of target sub-regions. The target sub-region is a sun-region, where a viewer is present, in the viewing region; the determining module 902 is configured to determine a target view based on the indication information, wherein the number of target views determined in the case that the number of target sub-regions is 1 is less than the number of target views determined in the case that the number of target sub-regions is greater than 1; and the transmitting module is configured to transmit image data of the target view to the 3D display terminal.

Optionally, the plurality of viewpoints correspond to different views in one-to-one correspondence, and the number of target sub-regions is greater than 1. The determining module 902 is configured to determine the views corresponding to the plurality of viewpoints as the target views.

Optionally, the plurality of viewpoints correspond to different views in one-to-one correspondence, and the number of target sub-regions is 1. The determining module 902 is configured to: determine the viewpoints used by the viewer of the 3D display terminal; and determine views, in the views corresponding to the plurality of viewpoints, corresponding to the viewpoints used by the viewer as the target views.

Optionally, the indication information includes a viewing position of the viewer of the 3D display terminal, and the indication information is generated by the 3D display terminal in the case that the number of target sub-regions is 1. The determining module 902 is configured to determine, according to a preset corresponding relationship between the viewpoint and the viewing position, determine a first viewpoint corresponding to the target sub-region; and determine the first viewpoint and N second viewpoints as the viewpoints used by the viewer. The N second viewpoints are N viewpoints closest to the first viewpoint in the plurality of viewpoints. N is an even number, and N is greater than or equal to 0.

Optionally, the indication information includes identification of a target viewpoint, and the indication information is generated by the 3D display terminal in the case that the number of target sub-regions is 1. The determining module 902 is configured to determine, based on the identification of the target viewpoint, determine the viewpoint used by the viewer of the 3D display terminal. The target viewpoint includes the first viewpoint, or the target viewpoints include the first viewpoint and the N second viewpoints. The first viewpoint is a viewpoint corresponding to the target sub-region0, and the N second viewpoints are N viewpoints closest to the first viewpoint in the plurality of viewpoints. N is an even number, and N is greater than or equal to 0. The viewpoints used by the viewer include the first viewpoint and the N second viewpoints.

Optionally, the transmitting module 903 is configured to transmit, in response to determining that the viewer is in a motion state, image data of the target view with a first resolution to the 3D display terminal; and transmits, in response to determining that the viewer is in a stationary state, image data of the target view with a second resolution to the 3D display terminal. The first resolution is lower than the second resolution.

Optionally, a resolution of the target view determined in the case that the number of target sub-regions is 1 is greater than a resolution of the target view determined in the case that the number of target sub-regions is greater than 1.

Figure 11:
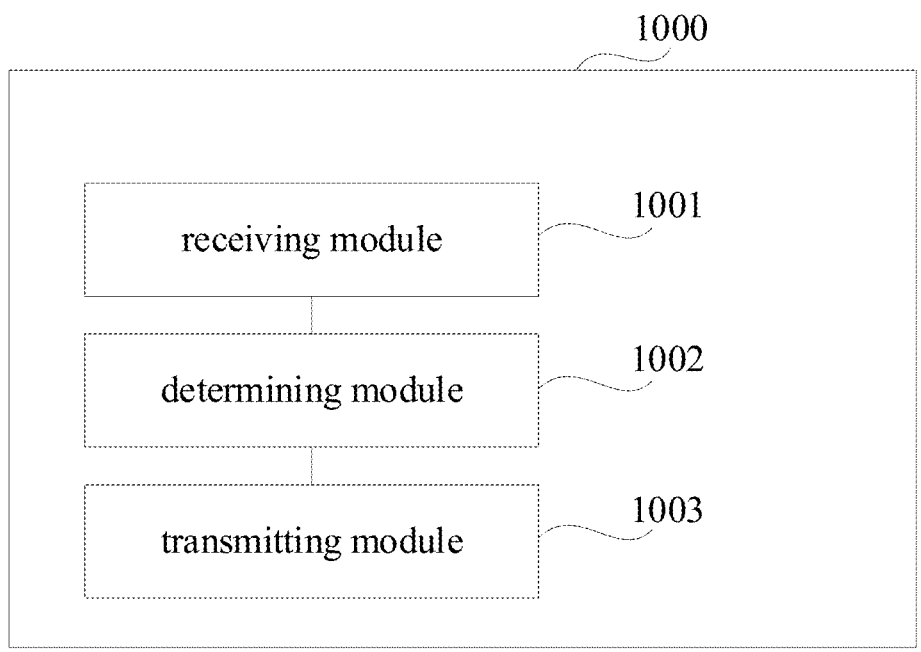
FIG. 11 is a block diagram of another apparatus for processing 3D image data according to some embodiments of the present disclosure.

FIG. 11 is a block diagram of another apparatus for processing 3D image data according to some embodiments of the present disclosure. Referring to FIG. 11, the apparatus 1000 is configured to provide 3D image data to a plurality of 3D display terminals. The plurality of 3D display terminals include a first display terminal and at least one second display terminal. The apparatus 1000 includes: a receiving module 1001, a determining module 1002, and a transmitting module 1003. The receiving module 1001 is configured to receive first view angle indication information, wherein the first view angle indication information is indicative of a first view angle of the first display terminal for a target object; the determining module 1002 is configured to determine, based on first view angle indication information, a first target view corresponding to the first view angle, wherein the number of first target views is less than the number of viewpoints in the first display terminal; and the transmitting module 1003 is configured to transmit image data of the first target view to the first display terminal and the at least one second display terminal.

Optionally, the first view angle indication information includes a viewing position of a viewer of the first display terminal. The determining module 1002 is configured to determine, according to a preset corresponding relationship between the viewpoint and the viewing position, a first viewpoint corresponding to the viewing position of the viewer of the first display terminal; and determine views corresponding to the first viewpoint and N second viewpoints as the first target views. The N second viewpoints are N viewpoints closest to the first viewpoint in the plurality of viewpoints. N is an even number, and N is greater than or equal to 0.

Optionally, the first view angle indication information includes an identification of the target viewpoint, and the target viewpoint includes the first viewpoint, or the target viewpoints include the first viewpoint and the N second viewpoints. The first viewpoint is a viewpoint corresponding to the viewing position of the viewer of the first display terminal, and the N second viewpoints are N viewpoints closest to the first viewpoint in the plurality of viewpoints. N is an even number, and N is greater than or equal to 0. The determining module 1002 is configured to determine, based on the identification of the target viewpoint, the views corresponding to the first viewpoint and the N second viewpoints as the first target views.

Optionally, the receiving module 1001 is further configured to receive second view angle indication information transmitted by a third display terminal. The third display terminal is one of the at least one second display terminal, and the second view angle indication information is indicative of a second view angle of the third display terminal for the target object. The determining module 1002 is further configured to determine, based on the second view angle indication information, a second target view corresponding to the second view angle. The transmitting module 1003 is further configured to transmit image data of the second target view to the third display terminal.

It should be noted that for the apparatus for processing the 3D image data according to the above embodiments, description is only given to the above division of the functional modules. In practice, the above functions of the apparatus may be distributed to different functional modules according to actual needs. That is, the apparatus is divided into different functional modules in terms of internal structure to implement a part or all of the functions described above. In addition, the apparatus for processing 3D display terminal according to the above embodiments is based on the same concept as the method embodiments described above, and the specific implementation process of the apparatus is detailed in the method embodiments, which is not repeated herein.

Figure 12:
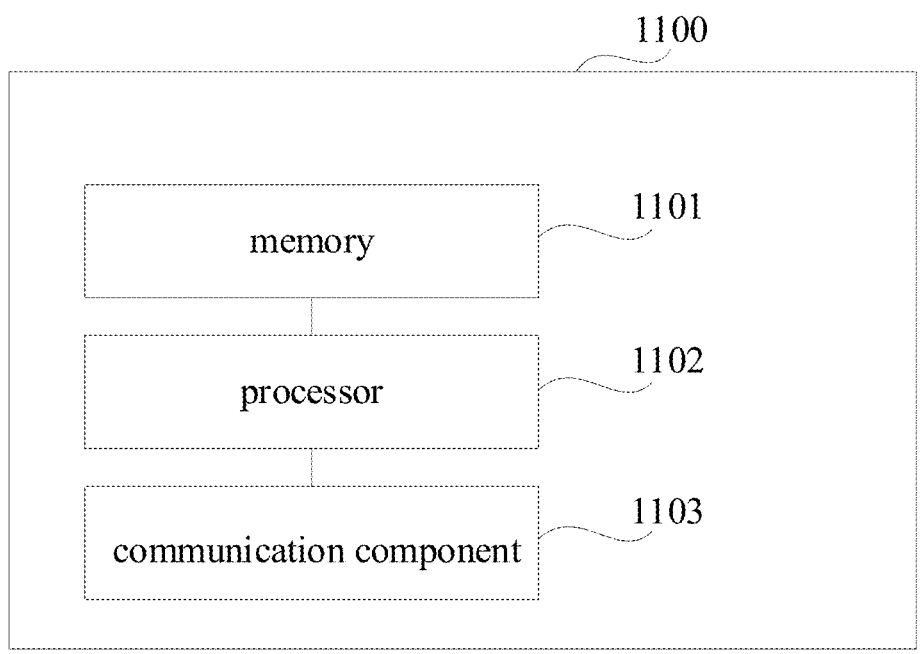
FIG. 12 is a structural schematic diagram of a computer device according to some embodiments of the present disclosure.

Referring to FIG. 12, some embodiments of the present disclosure further provide a computer device 1100. The computer device 1100 is a device for processing 3D image data, such as the server described above. The computer device 1100 is configured to perform the methods for process 3D image data according to the above embodiments. Referring to FIG. 12, the computer device 1100 includes: a memory 1101, a processor 1102, and a communication component 1103. The memory 1101 and the communication component 1103 are connected to the processor 1102 by a bus. It should be understood by those skilled in the art that, a structure of the computer device 1100 shown in FIG. 12 does not construe a limitation to the computer device 1100, and in practice, the computer device 1100 includes more or fewer components than the drawings, or a combination of certain components, or different arrangements of the components.

The memory 1101 is configured to store one or more computer programs and modules, and the memory 1101 mainly includes a program storage region and a data storage region. The program storage region stores an operating system, an application program required for at least one function. The memory 1101 includes a high-speed random-access memory, and further includes a non-volatile memory, such as at least one disk storage device, a flash memory device, or other non-volatile solid storage devices. Accordingly, the memory 1101 further includes a memory controller, configured to provide an access of the processor 1102 to the memory 1101.

The memory 1102 performs various functional applications and data processing by running the software programs and modules stored in the memory 1101.

The communication component 1103 is configured to communicate with a 3D display terminal, such as receiving indication information transmitted by the 3D display terminal and first view angle indication information, and transmitting image data to the 3D display terminal.

Some embodiments of the present disclosure further provide a display system. The display system includes: a server and a 3D display terminal. The 3D display terminal is provided with a plurality of viewpoints successively arranged, and a viewing region of the 3D display terminal includes a plurality of sub-regions. An arrangement direction of the plurality of sub-regions is consistent with an arrangement direction of the plurality of viewpoints. The viewpoints corresponding to different sub-regions are at least partially different. The 3D display terminal is configured to transmit indication information, wherein the indication information is indicative of the number of target sub-regions, and the target sub-region is a sub-region, where a viewer is present, in the viewing region. The server is configured to determine a target view based on the received indication information, wherein the number of target views determined in the case that the number of target sub-regions is 1 is less than the number of target views determined in the case that the number of target sub-regions is greater than 1; and transmits image data of the target view to the 3D display terminal. The 3D display terminal is further configured to display a 3D image based on the received image data.

For other details of the server and the 3D display terminal, reference may be made to the method embodiments as shown in FIG. 3 and FIG. 4, which are not repeated herein.

Some embodiments of the present disclosure further provide a display system. The display system includes: a server, a first display terminal, and a second display terminal. The first display terminal is configured to transmit first view angle indication information, wherein the first view angle indication information is indicative of a first view angle of the first display terminal of a target object. The server is configured to determine, based on the first view angle indication information, a first target view corresponding to the first view angle, wherein the number of first target views is less than the number of viewpoints in the first display terminal; and transmit image data of the first target view to the first display terminal and at least one second display terminal. The first display terminal and the second display terminal are further configured to display 3D images based on the received image data.

For other details of the server, the first display terminal, and the second display terminal, reference may be made to the method embodiments as shown in FIG. 6 and FIG. 7, which are not repeated herein.

Some exemplary embodiments further provide a computer-readable storage medium. The computer readable storage medium is a non-volatile storage medium, and stores one or more computer programs. The one or more computer programs in the computer-readable storage medium, when loaded and run by a processor, cause the processor to perform the method for processing 3D image data according to the embodiments of the present disclosure.

Some exemplary embodiments further provide a computer program product storing one or more instructions. The one or more instructions, when loaded and executed by a computer, cause the computer to perform the method for processing 3D image data according to the embodiments of the present disclosure.

Some exemplary embodiments further provide a chip including a programmable logic circuit and/or one or more program instructions. The chip, when run by a computer, causes the computer to perform the method for processing 3D image data according to the embodiments of the present disclosure.

It should be understood by those skilled in the art that all or part of steps in the embodiments described above may be implemented by hardware, or implemented by relevant hardware instructed by a program, and the program may be stored in a computer-readable storage medium. The storage medium described above is a read-only memory, a disk, or a light disk.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A method for processing three-dimensional image data, applicable to providing three-dimensional image data to a three-dimensional display terminal, wherein the three-dimensional display terminal is provided with a plurality of viewpoints successively arranged, and a viewing region of the three-dimensional display terminal comprises a plurality of sub-regions, an arrangement direction of the plurality of sub-regions being consistent with an arrangement direction of the plurality of viewpoints, and the viewpoints corresponding to different sub-regions being at least partially different;

the method comprising:
receiving indication information, wherein the indication information is indicative of a number of target sub-regions, the target sub-region being a sub-region, where a viewer is present, in the viewing region;
determining a target view based on the indication information, wherein a number of the target views determined in a case that the number of the target sub-regions is 1 is less than the number of the target views determined in a case that the number of the target sub-regions is greater than 1; and
transmitting image data of the target view to the three-dimensional display terminal.

2. The method according to claim 1, wherein
the plurality of viewpoints correspond to different views in one-to-one correspondence, and the number of the target sub-regions is greater than 1; and
determining the target view based on the indication information comprises:
determining the views corresponding to the plurality of viewpoints as the target views.

3. The method according to claim 1, wherein
the plurality of viewpoints correspond to different views in one-to-one correspondence, and the number of the target sub-regions is equal 1; and
determining the target view based on the indication information comprises:
determining a viewpoint used by the viewer of the three-dimensional display terminal; and
determining a view, in the views corresponding to the plurality of viewpoints, corresponding to the viewpoint used by the viewer as the target view.

4. The method according to claim 3, wherein
the indication information comprises a viewing position of the viewer of the three-dimensional display terminal, and the indication information is generated by the three-dimensional display terminal in the case that the number of the target sub-regions is 1; and
determining the viewpoint used by the viewer of the three-dimensional display terminal comprises:
determining, according to a preset corresponding relationship between the viewpoint and the viewing position, a first viewpoint corresponding to the target sub-region; and
determining the first viewpoint and N second viewpoints as the viewpoints used by the viewer, wherein the N second viewpoints are N viewpoints closest to the first viewpoint in the plurality of viewpoints;
wherein N is an even number, and N is greater than or equal to 0.

5. The method according to claim 3, wherein
the indication information comprises an identification of a target viewpoint, and the indication information is generated by the three-dimensional display terminal in the case that the number of the target sub-regions is 1; and
determining the viewpoint used by the viewer of the three-dimensional display terminal comprises:
determining, based on the identification of the target viewpoint, the viewpoint used by the viewer of the three-dimensional display terminal;
wherein the target viewpoint comprises a first viewpoint, or the target viewpoints comprise the first viewpoint and N second viewpoints, wherein the first viewpoint is a viewpoint corresponding to the target sub-region, and the N second viewpoints are N viewpoints closest to the first viewpoint in the plurality of viewpoints, N being an even number and greater than or equal to 0; and the viewpoints used by the viewer comprise the first viewpoint and the N second viewpoints.

6. The method according to claim 3, wherein transmitting the image data of the target view to the three-dimensional display terminal comprises:
transmitting image data of the target view with a first resolution to the three-dimensional display terminal, in response to determining that the viewer is in a motion state; and
transmitting image data of the target view with a second resolution to the three-dimensional display terminal, in response to determining that the viewer is in a stationary state;
wherein the first resolution is less than the second resolution.

7. The method according to claim 1, wherein a resolution of the target sub-region determined in the case that the number of the target sub-regions is 1 is greater than a resolution of the target sub-region determined in the case that the number of the target sub-regions is greater than 1.

8. A non-volatile computer-readable storage medium, storing one or more instructions, wherein the one or more instructions, when loaded and executed by a processor, cause the processor to perform the method for processing three-dimensional image data as defined in claim 1.

9. A computer program product, comprising: one or more instructions, wherein the computer program product, when running on a computer, causes the computer to perform the method for processing three-dimensional image data as defined in claim 1.

10. A method for processing three-dimensional image data, applicable to providing three-dimensional image data to a plurality of three-dimensional display terminals, wherein the plurality of three-dimensional display terminals comprise a first display terminal and at least one second display terminal;
the method comprising:
receiving first view angle indication information, wherein the first view angle indication information is indicative of a first view angle of the first display terminal for a target object;
determining, based on the first view angle indication information, a first target view corresponding to the first view angle, wherein a number of the first target views is less than a number of viewpoints in the first display terminal; and
transmitting image data of the first target view to the first display terminal and the at least one second display terminal.

11. The method according to claim 10, wherein
the first view angle indication information comprises a viewing position of a viewer of the first display terminal; and
determining, based on the first view angle indication information, the first target view corresponding to the first view angle comprises:
determining, according to a preset corresponding relationship between the viewpoint and the viewing position, a first viewpoint corresponding to the viewing position of the viewer of the first display terminal; and determining views corresponding to the first viewpoint and N second viewpoints as the first target views, wherein the N second viewpoints are N viewpoints closest to the first viewpoint in a plurality of viewpoints;

wherein N is an even number, and N is greater than or equal to 0.

12. The method according to claim 10, wherein the first view angle indication information comprises an identification of a target viewpoint, wherein the target viewpoint comprises a first viewpoint, or the target viewpoints comprise the first viewpoint and N second viewpoints, wherein the first viewpoint is a viewpoint corresponding to a viewing position of a viewer of the first display terminal, and the N second viewpoints are N viewpoints closest to the first viewpoint in a plurality of viewpoints, N being an even number, and N being greater than or equal to 0; and determining, based on the first view angle indication information, the first target view corresponding to the first view angle comprises:

determining, based on the identification of the target viewpoint, views corresponding to the first viewpoint and the N second viewpoints as the first target views.

13. The method according to claim 10, comprising:

receiving second view angle indication information transmitted by a third display terminal, wherein the third display terminal is one of the at least one second display terminal, and the second view angle indication information is indicative of a second view angle of the third display terminal for the target object;

determining, based on the second view angle indication information, a second target view corresponding to the second view angle; and transmitting image data of the second target view to the third display terminal.

14. A computer device, comprising: a processor and a memory; wherein the memory is configured to store one or more computer programs; and the processor, when loading and running the one or more computer programs, is caused to perform the method for processing three-dimensional image data as defined in claim 10.

15. A non-volatile computer-readable storage medium, storing one or more instructions, wherein the one or more instructions, when loaded and executed by a processor, cause the processor to perform the method for processing three-dimensional image data as defined in claim 10.

16. A computer program product, comprising: one or more instructions, wherein the computer program product, when running on a computer, causes the computer to perform the method for processing three-dimensional image data as defined in claim 10.

17. A computer device, comprising: a processor and a memory; wherein the memory is configured to store one or more computer programs; and the processor, when loading and running the one or more computer programs, is caused to perform a method for processing three-dimensional image data;

wherein the method is applicable to providing three-dimensional image data to a three-dimensional display terminal, wherein the three-dimensional display terminal is provided with a plurality of viewpoints successively arranged, and a viewing region of the three-dimensional display terminal comprises a plurality of sub-regions, an arrangement direction of the plurality of sub-regions being consistent with an arrangement direction of the plurality of viewpoints, and the viewpoints corresponding to different sub-regions being at least partially different; and the method comprises:

receiving indication information, wherein the indication information is indicative of a number of target sub-regions, the target sub-region being a sub-region, where a viewer is present, in the viewing region;

determining a target view based on the indication information, wherein a number of target views determined in a case that the number of the target sub-regions is 1 is less than the number of target views determined in a case that the number of target sub-regions is greater than 1; and transmitting image data of the target view to the three-dimensional display terminal.

18. The computer device according to claim 17, wherein the plurality of viewpoints correspond to different views in one-to-one correspondence, and the number of target sub-regions is greater than 1; and determining a target view based on the indication information comprises:

determining the views corresponding to the plurality of viewpoints as the target views.

19. The computer device according to claim 17, wherein the plurality of viewpoints correspond to different views in one-to-one correspondence, and the number of target sub-regions is equal 1; and determining the target view based on the indication information comprises;

determining a viewpoint used by the viewer of the three-dimensional display terminal; and determining a view, in the views corresponding to the plurality of viewpoints, corresponding to the viewpoint used by the viewer as the target view.

20. The computer device according to claim 17, wherein a resolution of the target sub-region determined in the case that the number of target sub-regions is 1 is greater than a resolution of the target sub-region determined in the case that the number of target sub-regions is greater than 1.

* * * * *